United States Patent
Ramesh et al.

(10) Patent No.: US 6,770,683 B2
(45) Date of Patent: Aug. 3, 2004

(54) FOAM COMPRISING A BLEND OF ETHYLENE/STYRENE INTERPOLYMER AND POLYETHYLENE

(75) Inventors: Natarajan S. Ramesh, Grapevine, TX (US); Thomas Greco, Slingerlands, NY (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 112 days.

(21) Appl. No.: 10/081,704

(22) Filed: Feb. 22, 2002

(65) Prior Publication Data

US 2003/0162856 A1 Aug. 28, 2003

(51) Int. Cl.$^7$ .................................................. C08J 9/00
(52) U.S. Cl. ........................... 521/79; 521/81; 521/139
(58) Field of Search .............................. 521/79, 81, 139

(56) References Cited

U.S. PATENT DOCUMENTS

| | | | |
|---|---|---|---|
| 3,893,957 A | 7/1975 | Mixon et al. | 260/2.5 |
| 3,965,229 A | 6/1976 | Driscoll | 264/50 |
| 4,738,810 A | 4/1988 | Cheng-Shiang | 264/54 |
| 5,346,926 A | 9/1994 | Sakamoto et al. | 521/81 |
| 5,428,093 A | 6/1995 | Lee | 524/317 |
| 5,462,974 A | 10/1995 | Lee | 521/79 |
| 5,658,625 A | 8/1997 | Bradfute et al. | 428/34.9 |
| 5,667,728 A | 9/1997 | Lee | 252/350 |
| 5,882,776 A | 3/1999 | Bambara et al. | 428/215 |
| 5,938,878 A | 8/1999 | Hurley et al. | 156/219 |
| 6,096,793 A | 8/2000 | Lee et al. | 521/134 |
| 6,160,029 A | 12/2000 | Chaudhary et al. | 521/139 |

FOREIGN PATENT DOCUMENTS

| | | |
|---|---|---|
| WO | 98/10015 | 3/1998 |
| WO | 00/15697 | 3/2000 |

*Primary Examiner*—Morton Foelak
(74) *Attorney, Agent, or Firm*—Thomas C. Lagaly

(57) ABSTRACT

A foam, comprising a blend of (a) from 0.1 to 4.9 weight percent ethylene/styrene interpolymer; and (b) from 95.1 to 99.9 weight percent polyethylene homopolymer or copolymer.

17 Claims, No Drawings

FOAM COMPRISING A BLEND OF ETHYLENE/STYRENE INTERPOLYMER AND POLYETHYLENE

BACKGROUND OF THE INVENTION

The present invention relates generally to polyolefin foams and, more particularly, to extruded foams comprising a blend of ethylene/styrene interpolymer and low density polyethylene.

Polyolefin foams, particularly polyethylene foams, and methods for manufacturing such foams are well known in the art. See, e.g., U.S. Pat. No. 5,348,984 (Lee), U.S. Pat. No. 5,462,974 (Lee), and U.S. Pat. No. 5,667,728 (Lee), the disclosures of which are incorporated herein by reference thereto. One of the most common polyethylenes used is low density polyethylene (LDPE).

While polyethylene (PE) possesses a number of beneficial physical and chemical properties when used to make foam, it also has a number of disadvantages. For example, the compression strength of foam made from PE is less than would otherwise be desired for certain applications, such as when foam is used for packaging, i.e., to serve as a cushion to absorb impacts, prevent movement, and otherwise protect packaged articles during shipment and storage. Increased compressive strength is desired in such applications because the foam is better able to withstand large impacts and bear the weight of relatively heavy objects, such as machine parts, equipment, furniture, etc., without collapsing.

Another disadvantage associated with the use of PE to make foams is that PE, particularly, LDPE, foams over a very narrow temperature range, resulting in a foaming temperature that must be tightly controlled to within +/−0.5° F. If the foaming temperature is too high, the foam collapses; if too low, the polymer either will not foam or the foam will have regions of solid, non-foamed polymer. As will be appreciated by those skilled in the art of foam production, it is quite a challenge to maintain the proper foaming temperature within such a tight tolerance when producing PE foam on a commercial scale, i.e., at flow rates in excess of 800 pounds/hour.

Further, an ongoing challenge in the production of PE foams is achieving the highest possible degree of uniformity of the cell structure within the foam, both in terms of the shape of the individual cells and also the distribution of the cells within the foam. Generally, the higher the degree of cell uniformity, the better will be the physical/mechanical properties of the foam.

Accordingly, a need exists in the art for an improved foam that overcomes the foregoing disadvantages and challenges.

SUMMARY OF THE INVENTION

The inventors hereof have determined that the compression strength of PE foams can be improved and the foaming temperature tolerance increased to +/−1° F. by blending ethylene/styrene interpolymer ("ESI") with the PE. In addition, the inventors found that the addition of ESI to PE provides a higher degree of cell uniformity.

Surprisingly, however, the inventors discovered that if more than 5 wt. % ESI is added to PE, the improvements in compression strength cease to exist and, perhaps more surprisingly, the compressive strength of the resultant foam deteriorates to such an extent that it is less than that of foam made from PE alone (i.e., with no added ESI).

Moreover, the inventors found that an ESI content above 5% caused the foam to exhibit more than 10% "creep." Creep, which may be determined in accordance with ASTM D3575-93, suffix BB, provides a measure of a foam's tendency to "flow" away from a region of pressure applied to the foam, thereby reducing the thickness of the foam in the area where pressure is applied. Creep is particularly problematic when foam is used in load-bearing packaging applications because the amount of cushioning provided by the foam diminishes over time as creep progresses. In general, a foam that exhibits more than 10% creep is commercially unacceptable for commercial packaging applications. When less than 5 wt. % ESI is blended with PE, the resultant foam was found to exhibit less than 10% creep.

Further, PE/ESI foams with less than 5% ESI were found to have more uniform cell distribution and a lower percentage of open cells than foams having more than 5% ESI. As noted above, more uniformity in the distribution of cells results in better mechanical properties. In addition, for packaging purposes, open cells are undesirable as they decrease the cushioning performance of the foam. Thus, a lower percentage of open cells is beneficial.

Accordingly, the present invention is directed to a foam, comprising a blend of
(a) from 0.1 to 4.9 weight percent ethylene/styrene interpolymer; and
(b) from 95.1 to 99.9 weight percent polyethylene homopolymer or copolymer, said weight percentages being based on the total amount of (a) and (b) in the blend.

Another aspect of the invention is directed toward a method for making a foam, comprising
(a) blending (1) from 0.1 to 4.9 weight percent ethylene/styrene interpolymer; and (2) from 95.1 to 99.9 weight percent polyethylene homopolymer or copolymer, said weight percentages being based on the total amount of (1) and (2) in the blend;
(b) mixing a blowing agent with the blend of step (a); and
(c) causing the blowing agent to expand within the mixture of step (b), thereby forming a foam.

DETAILED DESCRIPTION OF THE INVENTION

The ethylene/styrene interpolymer (ESI) used in accordance with the present invention belongs to a class of substantially random interpolymers that comprise polymer units derived from one or more α-olefin monomers with one or more vinyl or vinylidene aromatic monomers and/or a hindered aliphatic or cycloaliphatic vinyl or vinylidene monomers, and optionally, one or more other polymerizable ethylenically unsaturated monomer(s).

The term "substantially random interpolymers" as used herein means that the distribution of the monomers of said interpolymer can be described by the Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Preferably, substantially random interpolymers do not contain more than 15 percent of the total amount of vinyl or vinylidene aromatic monomer in blocks of more than 3 units. More preferably, the interpolymer is not characterized by a high degree of either isotacticity or syndiotacticity. This means that in the carbon$^{-13}$ NMR spectrum of the substantially random interpolymer, the peak areas corresponding to the main chain methylene and methine carbons, representing either meso diad sequences or racemic diad sequences, should not exceed 75 percent of the total peak area of the main chain methylene and methine carbons.

Suitable α-olefins include, for example, α-olefins containing from 2 to about 20, preferably from 2 to about 12, more preferably from 2 to about 8 carbon atoms. Particularly suitable are ethylene, propylene, butene-1, pentene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Suitable vinyl or vinylidene aromatic monomers, which can be employed to prepare the interpolymers, include, for example, those represented by the following formula:

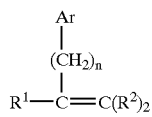

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl or vinylidene aromatic monomers include styrene, vinyl toluene, α-methyl styrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

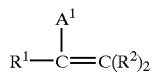

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Simple linear higher aliphatic alpha olefins such as propylene, 1-butene 1-hexene, 1-octene and the like are not examples of hindered aliphatic or cycloaliphatic vinyl or vinylidene compounds. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl- or aryl-substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

Other optional polymerizable ethylenically unsaturated monomer(s) include norbornene and $C_{1-10}$ alkyl- or $C_{6-10}$ aryl-substituted norbornenes. Exemplary substantially random interpolymers include ethylene/styrene, ethylene/styrene/propylene, ethylene/styrene/octene, ethylene/styrene/butene, and ethylene/styrene/norbornene interpolymers.

One method of preparation of the substantially random interpolymers includes polymerizing a mixture of polymerizable monomers in the presence of one or more metallocene or constrained geometry catalysts in combination with various cocatalysts.

The substantially random interpolymers include the pseudo-random interpolymers as described in EP-A-0,416,815 and EP-A-0,765,888 by James C. Stevens et al. and U.S. Pat. No. 5,703,187 by Francis J. Timmers, both of which are incorporated herein by reference in their entirety. The substantially random interpolymers also include the substantially random terpolymers as described in U.S. Pat. No. 5,872,201 which is incorporated herein by reference in its entirety. Also suitable are the substantially random interpolymers, which comprise at least one α-olefin/vinyl aromatic/vinyl aromatic/α-olefin tetrad disclosed in U.S. Pat. No. 6,191,245 B1 also incorporated herein by reference in its entirety.

The substantially random interpolymers can be prepared by polymerizing a mixture of polymerizable monomers in the presence of one or more metallocene or constrained geometry catalysts in combination with various cocatalysts. Preferred operating conditions for the polymerization reactions are pressures from atmospheric up to 3000 atmospheres and temperatures from −30° C. to 200° C. Examples of processes used to prepare the substantially random interpolymers are described in U.S. Pat. Nos. 6,048,909 and 6,231,795 B1, the contents of which are incorporated herein by reference in their entirety Examples of suitable catalysts and methods for preparing the substantially random interpolymers are disclosed in EP-A-0,416,815; EP-A-514,828 (U.S. Pat. No. 6,118,013); EP-A-520,732 (U.S. Pat. No. 5,721,185); as well as U.S. Pat. Nos. 5,055,438; 5,057,475; 5,096,867; 5,064,802; 5,132,380; 5,189,192; 5,321,106; 5,347,024; 5,350,723; 5,374,696; and 5,399,635; 5,470,993; 5,866,704; 5,959,047; 6,150,297; and 6,015,868; all of which US patents are incorporated herein by reference.

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non-solvent for either the interpolymer or the vinyl or vinylidene aromatic homopolymer. For the purpose of the present invention it is preferred that no more than 20 weight percent, preferably less than 15 weight percent based on the total weight of the interpolymers of atactic vinyl or vinylidene aromatic homopolymer is present.

The typical compositions of specific substantially random ethylene/styrene interpolymers that are available from The Dow Chemical Company are summarized in Table 1. The styrene content of the interpolymers, and the atactic polystyrene content, were determined by $^1$H NMR. Blends with polystyrene or low density polyethylene are also available.

TABLE 1

Compositions of Specific Product Grades of Ethylene Styrene Interpolymers (ESI)

| Dow ESI Product Grade | Wt % Incorporated Styrene | Melt Index, I2, (g/10 min) | Wt % atactic Polystyrene* |
|---|---|---|---|
| DE100.01 | 31.5 | 0.50 | 2.0 |
| DCAL1000 | 31.5 | 0.50 | 2.0 |
| DE102.01 | 42.0 | 0.75 | 3.0 |
| DCAL 1010 | 42.0 | 0.75 | 3.0 |
| DE104.01 | 37.0 | 0.75 | 3.0 |
| DE106.01 | 26.5 | 0.50 | 2.0 |
| DE200.01 | 31.5 | 1.00 | 2.0 |
| DCAL1040 | 31.5 | 1.00 | 2.0 |
| DE202.01 | 26.5 | 1.00 | 2.0 |
| DE300.01 | 31.5 | 0.50 | 2.0 |
| DE400.01 | 31.5 | 10.00 | 2.0 |
| DE402.01 | 21.3 | 10.00 | 2.0 |
| DS101.01 | 76.0 | 0.50 | 6.0 |
| DS103.01 | 62.0 | 0.50 | 3.0 |
| DS201.01 | 70.5 | 1.00 | 6.0 |
| DCAL1090 | 70.5 | 1.00 | 6.0 |
| DS203.01 | 76.0 | 1.00 | 6.0 |
| DS205.01 | 78.0 | 1.00 | 8.0 |
| DS301.01 | 70.5 | 5.00 | 6.0 |
| DS401.01 | 75.0 | 10.00 | 6.0 |
| DS401.02 | 78.0 | 6.50 | 8.0 |

*present with the ESI as a by-product of the interpolymerization reaction

Preferred ESIs in accordance with the present invention have the following characteristics:

(a) a styrene component ranging from about 20 to about 80 weight percent, based on the total weight of the interpolymer, and more preferably from about 50 to about 80 wt. %;

(b) a melt index ranging from about 0.5 to about 50 g/10 min.; and (c) a specific gravity ranging from about 0.91 to about 1.05 g/cc.

The polyethylene (PE) component of the inventive blend is a polyethylene homopolymer or copolymer. Suitable polyethylene homopolymers include low density polyethylene (LDPE) and high density polyethylene (HDPE). Suitable polyethylene copolymers include heterogeneous (Zeigler-Natta catalyzed) and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Other polyethylene copolymers that may be used include ethylene/vinyl acetate, ethylene/methyl acrylate, ionomers, and ethylene/propylene copolymers.

A preferred polyethylene is LDPE, particularly those having a melt flow index ranging from about 1 to about 40 g/10 min., more preferably from about 1 to about 20 g/10 min., and a density ranging from about 0.912 to about 0.930 g/cc.

As noted hereinabove, foams in accordance with the present invention comprise a blend of:

(a) from 0.1 to 4.9 weight percent ESI; and (b) from 95.1 to 99.9 weight percent polyethylene homopolymer or copolymer (the foregoing weight percentages are based on the total amount of (a) and (b) in the blend).

As demonstrated and discussed in the Examples below, such a blend has been found to result in a foam having an unexpected combination of beneficial properties that make the foam ideally suited for packaging uses. More preferably, the ESI is present in the blend at a weight percentage ranging from about 1 to about 4 and the polyethylene is present in the blend at a weight percentage ranging from about 96 to about 99.

Preferably, the foam has a density ranging from about 0.5 to about 15 pounds/ft$^3$. More preferably, the density ranges from about 1 to about 9 pounds/ft$^3$. The foam may be in the form of a sheet or plank having a thickness ranging from about 0.015 to about 5 inches; more preferably, from about 0.06 to about 3 inches; most preferably from about 0.09 to about 2 inches.

The inventive foams preferably have an open-cell content of less than 20 volume percent, and more preferably less than 15 volume percent. As noted above, a lower percentage of open cells is desired when employing foams in packaging applications because a lower open cell content has been found to improve the cushioning performance of the foam.

In producing foam as described herein, any conventional chemical or physical blowing agents may be used. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polymer resin (i.e., the blend of PE and ESI) in any desired amount to achieve a desired degree of expansion in the resultant foam. Generally, the blowing agent may be added to the polymer resin in an amount ranging from about 0.5 to 80 parts by weight, based on 100 parts by weight of the polymer. More preferably, the blowing agent is present at an amount ranging from 1 to 30 and, most preferably, from 3 to 15 parts per 100 parts by weight of the polymer.

If desired or necessary, various additives may also be included with the polymer. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process that is well known in the art. In such a process, the PE and ESI polymers are added to an extruder, preferably in the form of resin pellets. Any conventional type of extruder may be used, e.g., single screw, double screw, and/or tandem extruders. In the extruder, the resin pellets are melted and mixed. A blowing agent is preferably added to the melted polymer via one or more injection ports in the extruder. Any additives that are used may be added to the melted polymer in the extruder and/or may be added with the resin pellets. The extruder pushes the entire melt mixture (melted polymer, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

The foregoing, as well as other, aspects and advantages of the invention may be further understood by reference to the following examples, which are provided for illustrative purposes only and are not intended in any way to be limiting.

EXAMPLES

In the following examples, a twin-screw extruder was used with a rod die to make foam rods. The extruder had standard zones for feeding, melting, mixing and cooling. Three types of foams were produced: a foam comprising LDPE but no ESI ("Comparative Example A"); a foam comprising 97 wt. % LDPE and 3 wt. % ESI ("Example 1"); and a foam comprising 90 wt. % LDPE and 10 wt. % ESI ("Comparative Example B") [the foregoing weight percentages are based only on the amount of LDPE and ESI in the foam]. The LDPE had a melt index of 2.0 g/10 min. and a density of 0.919 g/cc, and was added to the extruder in granular form. The ESI was DS205.01 from Dow Chemical, having 78 wt. % styrene content and a melt index of 1.0 g/10 min, and was also added to the extruder in granular form. In addition to the LDPE and ESI resins, talc was added as a nucleating agent, glycerol monostearate was added as an aging modifier, and isobutane was used as a blowing agent. The formulations, run conditions, and properties are shown in the following table.

TABLE 1

| Formulation, Run Conditions, and Properties | Comparative Example A: 0% ESI | Example 1: 3% ESI | Comparative Example B: 10% ESI |
|---|---|---|---|
| LDPE resin rate, Lbs./hr | 150 | 145.5 | 135 |
| ESI Resin Rate, Lbs./hr | 0 | 4.5 | 15 |
| % ESI in LDPE/ESI Blend (by weight) | 0% | 3% | 10% |
| Isobutane Rate, Lbs/hr | 6.44 | 6.44 | 6.44 |
| Screw Speed, RPM | 51 | 51 | 51 |
| Motor Amps, | 78 | 73 | 78 |
| Melt Temp., F | 231 | 232 | 231 |
| Final Foam Density, pcf | 2.63 | 2.49 | 2.62 |
| Cell Count, Cells/Inch, MD/CMD/Vertical | 23/21/18 | 23/21/23 | 24/22/21 |
| Compression Strength @ 5%, psi (ASTM D3575-93 Suffix D) | 2.63 | 2.68 | 2.11 |
| Compression Strength @ 10%, psi (ASTM D3575-93 Suffix D) | 3.79 | 3.86 | 3.26 |
| Compression Strength @ 25%, psi (ASTM D3575-93 Suffix D) | 5.29 | 5.43 | 4.53 |
| Compression Strength @ 50%, psi (ASTM D3575-93 Suffix D) | 10.60 | 10.90 | 9.08 |
| % Creep @ 2 psi in 72 hours (ASTM D3575-93 Suffix BB | 3.68% | 5.47% | 13.33% |
| % Open Cell Content (ASTM D2856) | 10.77% | 10.68% | 35.26% |
| Foam Quality | Acceptable | Good; also 5.3% lower in density but with improved compression | Not acceptable: >10% creep, poor compression, and >35% open cells |

By comparing Comparative Example A with Example 1, it may be seen that the addition of 3% ESI to 97% LDPE increased the compression strength of the foam vs. the compression strength obtained from 100% LDPE foam. Advantageously, such increase in compression strength did not come at the expense of causing an increase in creep to greater than 10%, which is the threshold above which a foam becomes unacceptable for packaging use. Further, the addition of 3% ESI to LDPE improved the uniformity of cell distribution as indicated by the three-dimensional cell counts in the machine direction (MD), cross-machine direction (CMD) and vertical direction, which are closer in value in the foam of Example 1 than in the foam of Comparative Example A, particularly in the vertical direction.

By contrast, in the foam of Comparative Example B, in which the ESI content was increased to 10%, the compression strength, creep performance, and open cell content worsened dramatically. Not only did the increase in ESI content from 3% to 10% cause a decrease in compression strength, surprisingly, such decrease in compression strength resulted in the 10% ESI foam having lower compression strength than 100% LDPE foam. In addition, the creep value of foam with 10% ESI increased above 10%, rendering such foam unsuitable for commercial packaging use. Moreover, the percentage of open cells increased greatly from about 11% in the foam of Example 1, to more than 35% in the foam of Comparative Example B. This amount of open cells further renders the foam of Comparative Example B unsuitable for commercial packaging use.

While the invention has been described with reference to illustrative examples, those skilled in the art will understand that various modifications may be made to the invention as described without departing from the scope of the claims which follow.

What is claimed is:

1. A foam, comprising a blend of
   (a) from 0.1 to 4.9 weight percent ethylene/styrene interpolymer; and
   (b) from 95.1 to 99.9 weight percent polyethylene homopolymer or copolymer, said weight percentages being based on the total amount of (a) and (b) in the blend.

2. The foam of claim 1, wherein the ethylene/styrene interpolymer is present in the blend at a weight percentage ranging from 1 to 4 and the polyethylene is present in the blend at a weight percentage ranging from 96 to 99.

3. The foam of claim 1, wherein the foam has an open-cell content of less than 20 volume percent.

4. The foam of claim 3, wherein the foam has an open-cell content of less than 15 volume percent.

5. The foam of claim 1, wherein the foam is in the form of a sheet having a thickness ranging from about 0.015 to about 5 inches.

6. The foam of claim 1, wherein the foam has a density ranging from about 0.5 to about 15 pounds/cubic foot.

7. The foam of claim 1, wherein the ethylene/styrene interpolymer comprises a styrene component ranging from about 20 to about 80 weight percent.

8. The foam of claim 1, wherein said polyethylene homopolymer or copolymer comprises at least one material selected from low density polyethylene, high density polyethylene, and ethylene/alpha-olefin copolymer.

9. A method for making a foam, comprising
   (a) blending
      (1) from 0.1 to 4.9 weight percent ethylene/styrene interpolymer; and
      (2) from 95.1 to 99.9 weight percent polyethylene homopolymer or copolymer, said weight percentages being based on the total amount of (1) and (2) in the blend;
   (b) mixing a blowing agent with the blend of step (a); and
   (c) causing the blowing agent to expand within the mixture of step (b), thereby forming a foam.

10. The method of claim 9, wherein the blowing agent comprises a physical blowing agent.

11. The method of claim 9, wherein the ethylene/styrene interpolymer is present in the blend at a weight percentage ranging from 1 to 4 and the polyethylene is present in the blend at a weight percentage ranging from 96 to 99.

12. The method of claim 9, wherein the ethylene/styrene interpolymer is present in the blend at a weight percentage ranging from 1 to 4 and the polyethylene is present in the blend at a weight percentage ranging from 96 to 99.

13. The method of claim 12, wherein the foam has an open-cell content of less than 20 volume percent.

14. The method of claim 9, wherein the foam is in the form of a sheet having a thickness ranging from about 0.015 to about 5 inches.

15. The method of claim 9, wherein the foam has a density ranging from about 0.5 to about 15 pounds/cubic foot.

16. The method of claim 9, wherein the ethylene/styrene interpolymer comprises a styrene component ranging from about 20 to about 80 weight percent.

17. The method of claim 9, wherein said polyethylene homopolymer or copolymer comprises at least one material selected from low density polyethylene, high density polyethylene, and ethylene/alpha-olefin copolymer.

* * * * *